(12) United States Patent  
Yoon (10) Patent No.: US 7,659,013 B2  
(45) Date of Patent: Feb. 9, 2010

(54) PLASTIC MOLDING TYPE SECONDARY BATTERY AND METHOD OF FORMING THE SAME

(75) Inventor: Heui Sang Yoon, Cheonan-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 714 days.

(21) Appl. No.: 11/095,089

(22) Filed: Mar. 30, 2005

(65) Prior Publication Data

US 2005/0221130 A1 Oct. 6, 2005

(30) Foreign Application Priority Data

Mar. 30, 2004 (KR) .................... 10-2004-0021429

(51) Int. Cl.
*H01M 2/10* (2006.01)
(52) U.S. Cl. .......................... 429/7; 429/176
(58) Field of Classification Search .............. 429/7, 429/176
See application file for complete search history.

(56) References Cited

U.S. PATENT DOCUMENTS

| | | | |
|---|---|---|---|
| 7,252,903 B2 * | 8/2007 | Kawabata et al. | 429/53 |
| 7,396,600 B2 * | 7/2008 | Watanabe et al. | 429/7 |
| 2004/0091769 A1 * | 5/2004 | Kawabata et al. | 429/163 |

FOREIGN PATENT DOCUMENTS

| | | | |
|---|---|---|---|
| JP | 2000315483 A | * | 11/2000 |
| JP | 2003-288872 | | 10/2003 |

OTHER PUBLICATIONS

IPDL Machine Translation of JP 2003-288872A.*
Patent abstracts of Japan for publication 2003-288872 dated Oct. 10, 2003 in the name of Koji Koyakata, et al.

* cited by examiner

*Primary Examiner*—Gregg Cantelmo
(74) *Attorney, Agent, or Firm*—Christie, Parker & Hale, LLP (57) ABSTRACT

A method of forming a plastic molding type secondary battery. A protective circuit board is electrically connected to a bare cell, both mounted in a mold. The mold is capable of receiving the protective circuit board connected to the bare cell and at least of a part of the bare cell, and has an insertable core corresponding to the surface of an external I/O terminal, which is axially movable so as to contact the terminal surface. Supporting pins are trans-axially dispersed in the mold so that a lateral part of the pin is in contact with the back surface of the protective circuit board disposed in a correct position. A resulting plastic molding type secondary battery has pinholes formed on a part made of the plastic molding in the direction parallel to the protective circuit board so as to come into contact with one surface of the protective circuit board.

5 Claims, 10 Drawing Sheets

PLASTIC MOLDING TYPE SECONDARY BATTERY AND METHOD OF FORMING THE SAME

CROSS-REFERENCE TO RELATED APPLICATION(S)

This application claims priority to and the benefit of Korean Patent Application Number 2004-21429, filed Mar. 30, 2004, the entire disclosure of which is incorporated herein by reference.

BACKGROUND OF THE INVENTION

1. Field of the Invention

The present invention relates to a secondary battery and a method of forming the same, and more particularly to a plastic molding type secondary battery in which a gap between a bare cell and a protective circuit board is filled with a plastic molding, and a molding method thereof.

2. Description of the Prior Art

As is generally known in the art, secondary batteries are rechargeable and can be made in a compact form with a large capacity. Thus, secondary batteries have been recently broadly researched and developed. Typical examples of such secondary batteries include nickel metal-hydride (Ni-MH) batteries, lithium (Li) batteries and lithium-ion (Li-ion) batteries.

In such secondary batteries, most bare cells are formed by inserting an electrode assembly including a positive electrode, a negative electrode and a separator into a can formed from a metal such as, for example, aluminum, coupling a cap assembly to the can, injecting an electrolyte into the can, and then sealing the can.

However, a battery is an energy source and the battery has the potential to discharge a large amount of energy. In the case of a secondary battery, a large amount of energy is stored in the battery when it is charged. Also, in order to charge the secondary battery, an external energy source is needed for supplying the energy to be stored in the battery. When an internal short circuit or other disorder of the secondary battery is generated during the above described process or state, the energy stored in the battery may be discharged in a short time, thereby causing safety problems such as fire, explosion, or the like.

Accordingly, in general, a secondary battery is equipped with various kinds of safety devices for preventing fire or explosion caused by disorder of the battery itself in a charged state or during the charging process of the battery. Among these safety devices, a protective circuit board is generally connected to a positive terminal and a negative terminal of a bare cell by a conductive structure, a so-called lead plate. Such a protective circuit board may further include a Positive Temperature Coefficient (PTC) device or a bimetal device. In this case, the protective circuit board can break electric current, for example, when a battery is heated to a high temperature or when battery voltage rapidly increases due to, for example, overcharging/overdischarging, thereby preventing dangers such as explosion and firing of the battery.

A secondary battery including a bare cell coupled with a protective circuit board is enclosed in a separate casing to provide a finished secondary battery. In some cases, the gap between a bare cell and a protective circuit board connected by welding, is filled with a plastic molding to provide a plastic molding type secondary battery. For purposes of downsizing a plastic molding type secondary battery, an external I/O (Input/Output) terminal for making an electric connection between the battery and an external circuit may be formed on one surface of the protective circuit board. This allows the I/O terminal to be exteriorly exposed without the use of, for example, a lead wire.

Figure 1:
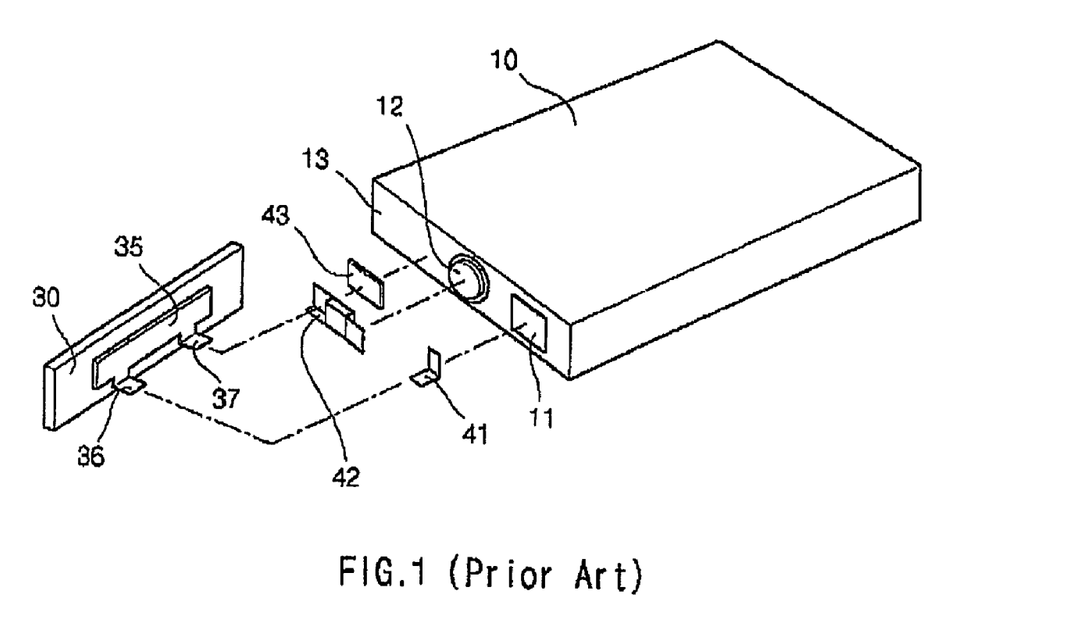
FIG. 1 is a schematic exploded perspective view showing a conventional pack-type lithium-ion battery before coupling with a plastic molding.
Figure 2:
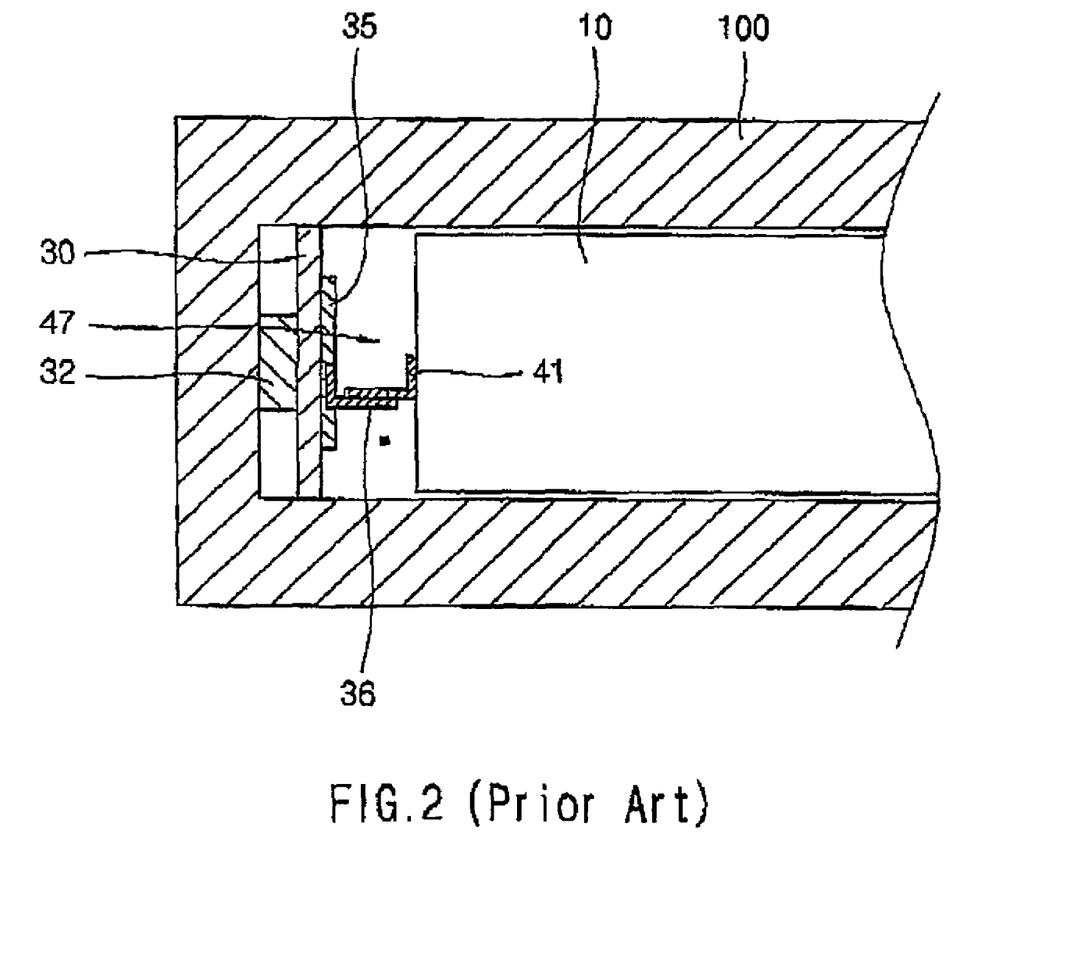
FIG. 2 is a sectional view showing a conventional pack-type lithium-ion battery in which a bare cell and a lead plate of a protective circuit board are welded to each other and mounted in a mold.

FIG. 1 is a schematic exploded perspective view showing a conventional pack-type lithium-ion battery before coupling with a plastic molding. FIG. 2 is a sectional view showing a conventional pack-type lithium-ion battery in which a bare cell and a lead plate of a protective circuit board are welded to each other and mounted in a mold.

Referring to FIGS. 1 and 2, a protective circuit board 30 is disposed parallel with a surface, on which electrode terminals 11, 12 of a bare cell of a pack-type battery are formed. Additionally, as shown in FIG. 2, a gap 47 exists between the bare cell 10 and the protective circuit board 30 and may be filled with a plastic molding. When the plastic molding is filled, it may cover the back surface opposite the surface of the protective circuit board facing the bare cell. However, an external I/O terminal 32 formed on the back surface must be exposed to the exterior.

The bare cell 10 includes a positive terminal 11 and a negative terminal 12 on the surface facing to the protective circuit board 30. The positive terminal 11 may be, for example, a cap plate or a metal plate bonded to a cap plate. The negative terminal 12 is a terminal protruding vertically from a cap plate, and is electrically isolated from the cap plate 13 by a peripheral insulator gasket.

The protective circuit board 30 includes a panel formed of a resin, on which a circuit is disposed, and the external I/O terminal 32, formed on the outer surface thereof. The protective circuit board 30 has dimensions and a shape which are substantially the same as those of the surface (cap plate surface) of the bare cell facing thereto.

The back surface of the protective circuit board 30 opposite the surface on which multiple external I/O terminals 32 are formed, i.e., the internal surface of the protective circuit board, is equipped with a circuit section 35 and connection terminals 36, 37. The circuit section 35 includes, for example, a protective circuit for protecting a battery from overcharging/overdischarging during charging/discharging of the battery. The circuit section 35 and each external I/O terminal 32 are electrically connected to each other by a conductive structure passing through the protective circuit board 30.

Lead plates 41, 42 and an insulating plate 43 are disposed between the bare cell 10 and the protective circuit board 30. The lead plates 41, 42, generally formed of nickel, are used to make an electric connection between positive terminal 11 and negative terminal 12 and its respective connection terminal 36, 37 of the protective circuit board 30. Also, they may have an "L"-shaped form or a planar structure. By connecting each terminal 36, 37 of the lead plates 41,42 through, for example, welding, it is possible to make electric connections, but such connections may not ensure mechanical integrity of the entire structure. In other words, even if the lead plates 41, 42 are welded with the connection terminals 36, 37, the protective circuit board may not be firmly fixed to the bare cell.

Further, as shown in FIG. 2, when the bare cell 10 welded to the protective circuit board 30 is mounted into a mold 100, it is necessary to protect the surface of the external I/O terminal 32 from being covered with a plastic molding in order to allow an electric connection to be made with an external circuit. If the external I/O terminal 32 is formed to protrude from the surface of the protective circuit board, it is possible for the surface of the terminal 32 to be in direct contact with the inner surface of the mold 100, as shown in FIG. 2. In addition to this method, it is also possible to form the mold 100 to take a protruded inside shape sufficient to be in contact with the external I/O terminal 32 of the protective circuit board for the purpose of protecting the surface of the terminal 32.

In order to protect the surface of the external I/O terminal 32, it is possible for the surface to be in contact with the inner surface of the mold, from the starting point of mounting the protective circuit board 30 in the mold. However, in this process, there is a great potential to generate a gap between the inner surface of the mold and the surface of the external I/O terminal 32 of the protective circuit board. To solve this problem, another method may be used. Specifically, the protective circuit board 30 and the bare cell are mounted in the mold 100, wherein the inner surface of the mold facing the surface of the terminal 32 is movable, and then that surface is moved toward the surface of the terminal 32.

Figure 3:
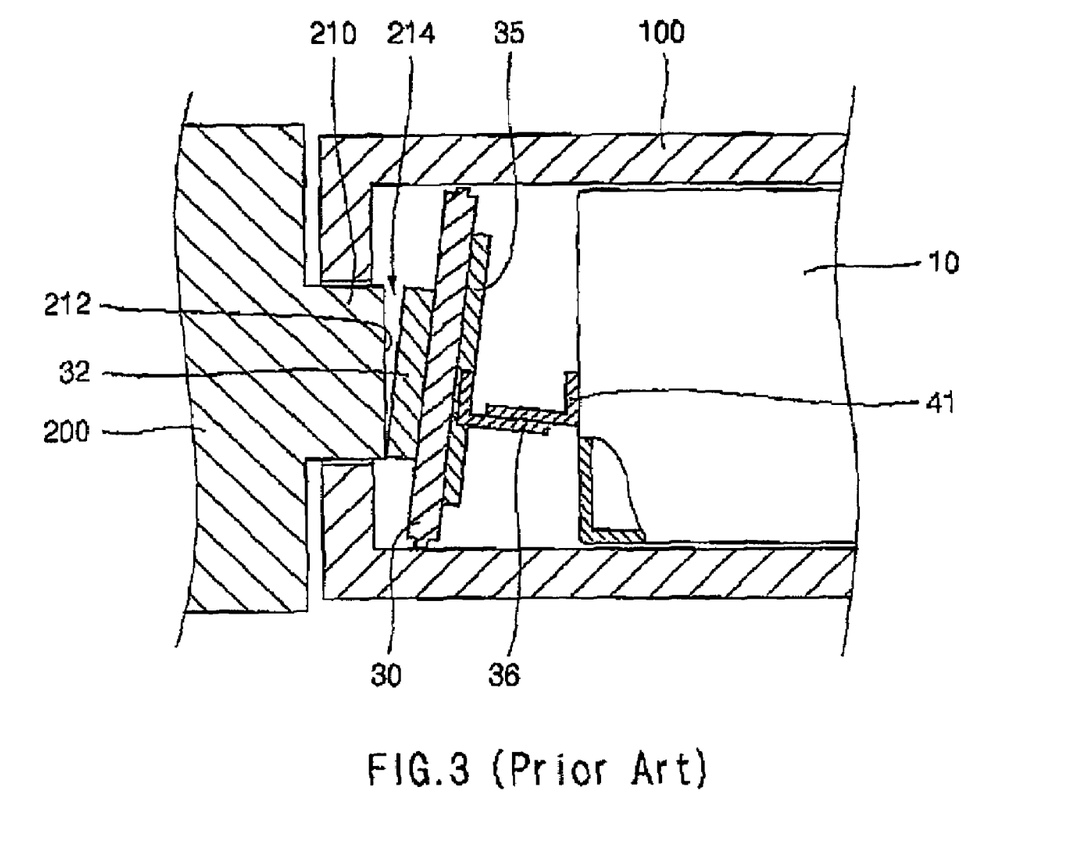
FIG. 3 is a sectional view showing a problem occurring in the prior art in which a protective circuit board is inclined away from its correct position, and thus a fine wedge-shaped gap is generated between the front-end of a core and the surface of an external I/O terminal of the protective circuit board.

More particularly referring to FIG. 3, it is possible to place the surface of the mold 100 in contact with the external I/O terminal 32 by moving a part of the surface of the mold toward the surface of the terminal so as to form an opening in the mold at a location corresponding to the external I/O terminal, inserting a post-type core 210 into the opening, and advancing the core 210 to protrude into the inner surface of the mold 100.

When a core 210 is used in the mold, the plastic molding process may be performed as follows. First, a protective circuit board 30 connected to a bare cell 10 is mounted in a mold 100 adapted to receive the protective circuit board 30 in a process of forming a secondary battery. Next, the core 210 is moved toward the protective circuit board 30 through an opening of the mold 100, so that the front-end 212 of the core 210 is in contact with the surface of the external I/O terminal 32 of the protective circuit board 30. Finally, a liquid plastic resin is injected into the mold 100, and then the plastic resin is solidified.

Figure 4:
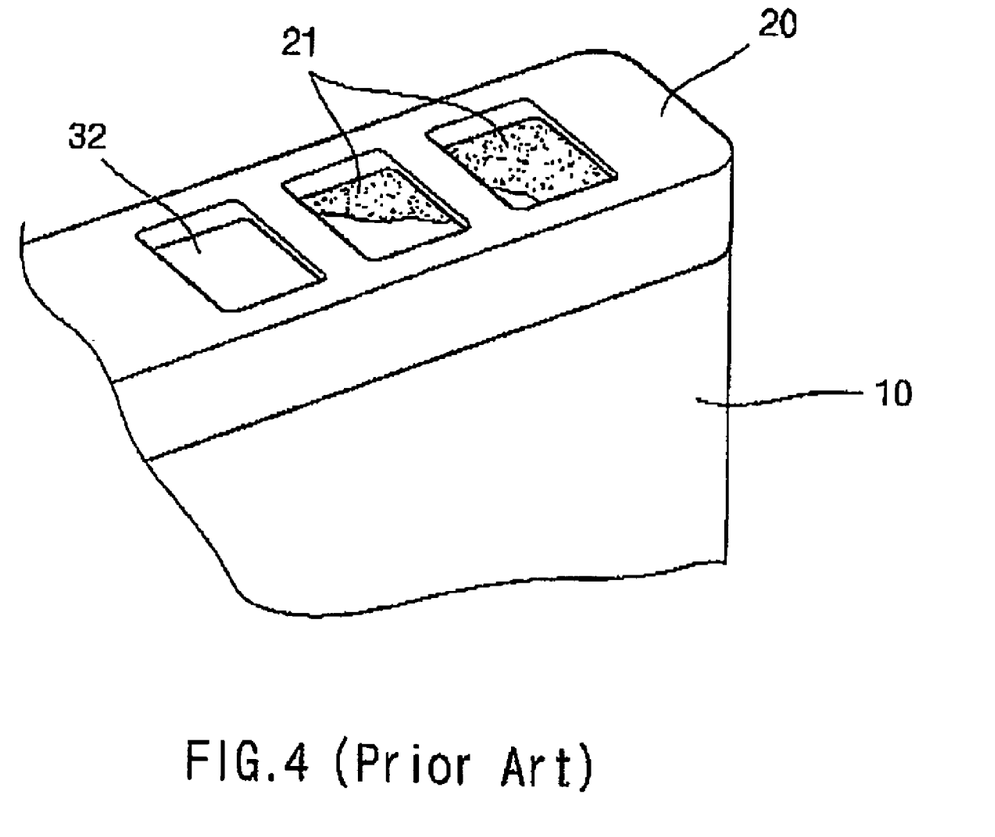
FIG. 4 is a partial perspective view showing a so-called "flash defect" problem occurring in the prior art, in which a part of the surface of an external I/O terminal is insulated with a resin film in a plastic molding type secondary battery.

However, in the above-described process, when the core 210 is moved, the protective circuit board 30 is fixed to the bare cell 10 only by a connection between each thin lead plate 41,42 and each connection terminal 36, 37 which tends to push the protective circuit board irregularly toward the bare cell 10. In this case, as shown in FIG. 3, the protective circuit board 30 may be oriented away from its correct position, and thus a fine wedge-shaped gap 214 may be generated between the front-end of the core 210 and the surface of the external I/O terminal 32 of the protective circuit board. If the gap 214 is filled with a plastic molding 20, a problem, so-called a "flash defect," may be generated. A flash defect may occur when a part of the surface of the external I/O terminal 32 is coated with a plastic film 21, as shown in FIG. 4. Additionally, due to the incorrect position of the protective circuit board, other factors responsible for quality below defined standards may be generated.

In order to prevent the protective circuit board from being pushed irregularly toward the bare cell while the core is moved, a method of disposing a support structure made of the same plastic as the molding between the bare cell and the protective circuit board may be used to mount the protective circuit board coupled to the bare cell by lead plates. However, such a support structure may cause another problem in that it may disturb efficient injection of a plastic resin in the step of pouring the plastic into the mold. Accordingly, there is a need for a method and a device to solve the problems as described above.

SUMMARY OF THE INVENTION

AN exemplary embodiment of the present invention is provided whereby a surface of an external I/O terminal of a protective circuit board is prevented from being covered with a plastic molding during a process for protecting the terminal surface. The process may include moving an insertable part of a mold corresponding to the terminal surface to be in contact with the terminal surface during the formation of a plastic molding type secondary battery. The secondary battery may be formed by supportively mounting a protective circuit board and a bare cell, electrically connected to each other through lead plates, in a mold, and pouring a liquid plastic resin into a gap between the protective circuit board and the bare cell.

An embodiment of the present invention provides a plastic molding type secondary battery and a method of forming the same, wherein the battery and the method prevent the problem wherein a gap is generated such that plastic resin between the terminal surface and the front-end of the mold covers the surface of the external I/O terminal with the plastic molding and interferes with the quality of the secondary battery.

In one exemplary embodiment of the present invention, a plastic molding type secondary battery and a method of forming the same are provided, wherein the battery and the method correctly orients a misaligned protective circuit board while also eliminating factors responsible for poor quality of the battery due to the misalignment of the protective circuit board.

More specifically, a method is disclosed including mounting a bare cell and a protective circuit board in a mold; disposing supporting pins in the mold so that a lateral part of the supporting pin is in contact and is correctly aligned with a back surface of the protective circuit board, inserting an insertable core to cause a front-end of the insertable core to move through an axial opening formed on the mold and contact a surface of an external I/O terminal formed on the outer surface of the protective circuit board; and pouring a plastic resin into the mold.

According to one embodiment of the present invention, the bare cell is connected to electric connection leads of the protective circuit board by welding, for example, before mounting them in the mold.

Generally, the mold is adapted to receive the bare cell and the protective circuit board entirely. However, the mold may also be adapted to receive only the upper part of the protective circuit board and the bare cell.

A moveable portion of the mold may be moved under pressure so that it is in close contact with the surface of the external I/O terminal and so that it applies a certain degree of pressure to the protective circuit board. However, such a pressure should not be enough to move the protective circuit board away from its correct position because the supporting pins are disposed on the backside of the protective circuit board.

In order to make the protective part in the above-described manner, the protective part may be formed as an insertable core so that it may be distinguished from the other parts of the mold. More particularly, an opening is formed in the mold at the part corresponding to the surface of the external I/O terminal of the protective circuit board, a post-shaped core is inserted into the opening, and then the core is advanced so that the front-end of the core protrudes into the inner surface of the mold. Eventually, the front-end of the core protruding as described above will be in close contact with the external I/O terminal. Accordingly, even if the mold is filled with a plastic resin, the resin cannot infiltrate the contact surface, thereby preventing the so-called "flash defect".

According to a further embodiment of the present invention, supporting pins are inserted from the exterior of the mold to the interior of the mold through pinhole(s) formed in a predetermined position of the mold. More specifically, the supporting pins may be inserted through a pinhole formed in a predetermined position of the lateral part of the mold when viewed from the direction of the movement of the protective part, so that the supporting pins are in contact with the back surface of the protective circuit board. However, the supporting pins may be also formed inside the mold when the bare cell connected to the protective circuit board is mounted in the mold.

When the supporting pins are disposed by inserting them into the mold, at least one supporting pin may have a tapered portion at its end inserted in the mold in the direction of the protective circuit board, when viewed from the longitudinal section. In this case, when the protective circuit board moves away from its correct position due to the insertion of the supporting pins into the mold, the tapered portion may be in contact with the outer wall part of the protective circuit board, thereby correcting the position of the protective circuit board.

In a further embodiment, at least one supporting pin may have a step at its end, when viewed from the longitudinal section, wherein the step is thinner than other parts of the pin and is in contact with the back surface of the protective circuit board. The supporting pins extending from the exterior of the mold to the interior of the mold may be relatively thinner at the interior of the mold, and relatively thicker at the exterior of the mold.

Additionally, at least two supporting pins may be formed at both longer lateral sides of the mold because such supporting pins support the protective circuit board uniformly and stably against pressure caused by the movement of the core.

Additionally, a plastic molding type secondary battery is also provided, the battery including a bare cell and a protective circuit board connected to each other through a plastic molding for filling the space between them. The plastic molding type secondary battery may include pinholes formed on a part made of the plastic molding in the direction parallel to the protective circuit board so as to come into contact with one surface of the protective circuit board facing the bare cell over a predetermined zone thereof.

Pinholes may be formed in both sidewalls of the part made of the plastic molding at equal levels on both sides. The pinhole may have a circular shape, a semi-circular shape or any other polygonal shape when viewed from the vertical section to the direction of the pinhole or from the entrance of the pinhole.

At least one pinhole may have a tapered portion at its end, the tapered portion being inclined in the direction toward the protective circuit board, when viewed from the longitudinal section to the direction of the pinhole.

DETAILED DESCRIPTION

A mold for a secondary battery according to an exemplary embodiment of the invention is explained generally as follows. The mold in its complete form includes an upper mold portion and a lower mold portion coupled to each other. The upper mold portion and the lower mold portion may be two pieces of mold disposed on a larger surface of a square type battery parallel to the same. Alternatively, the upper mold portion and the lower mold portion may have a cavity adapted to receive the protective circuit and the connection part of the bare cell, and a cavity adapted to receive the lower part of the bare cell, respectively. For example, when the upper mold portion and the lower mold portion are disposed on the larger surface of a can parallel to the same, the inside part of each of the upper mold portion and the lower mold portion has a cavity having a shape corresponding to the bare cell coupled with the protective circuit board. This ensures that the assembly of the bare cell and the protective circuit board is disposed in a correct position. The mold completed by coupling the upper mold portion and the lower mold portion may include a pinhole-type gate, through which molten plastic resin may be injected into the space between the protective circuit board and the bare cell. Additionally, a runner providing a path for the plastic resin may be connected to the gate. Although the mold and a part of the runner may be integrally formed, remaining resins may be easily solidified in the runner, thereby obstructing the path. Therefore, the rubber is usually formed independently from the mold, and is changed and discarded after use.

Figure 5:
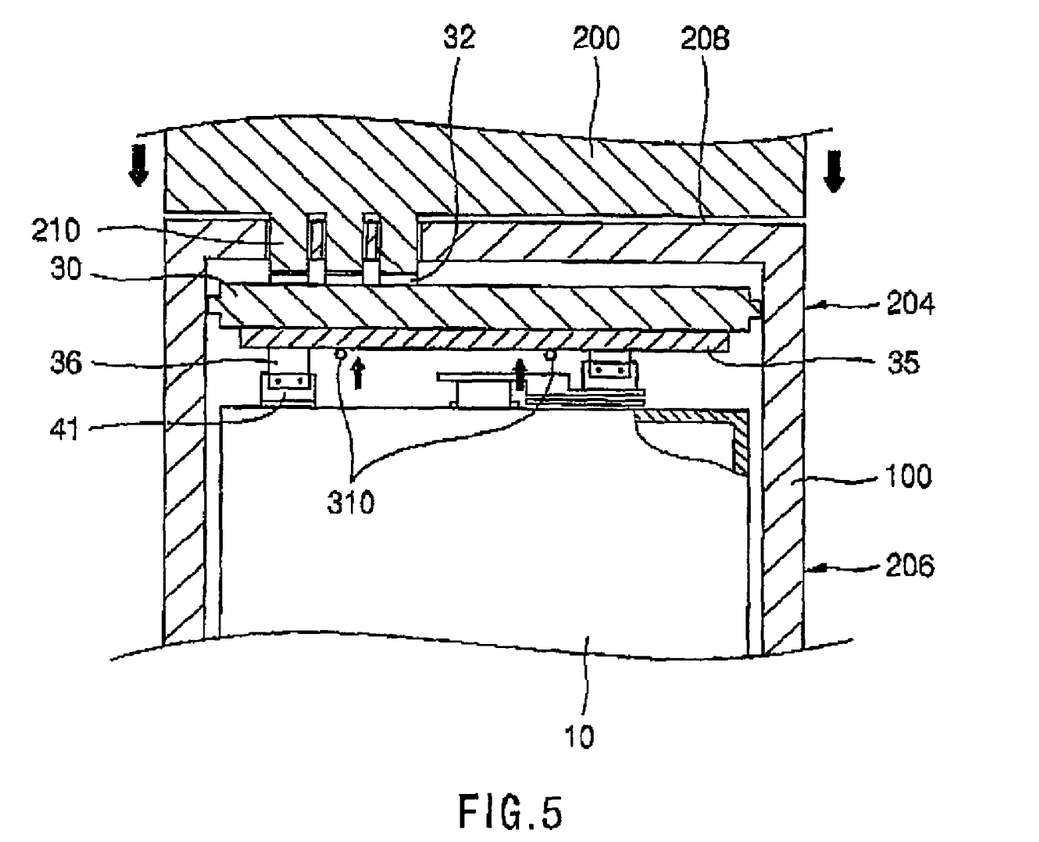
FIG. 5 is a partial sectional view showing an exemplary embodiment of the present invention in which a protective circuit board connected to a bare cell is mounted in a mold for plastic molding and supporting pins are disposed in the mold so as to be in contact with the back surface of the protective circuit board.
Figure 6:
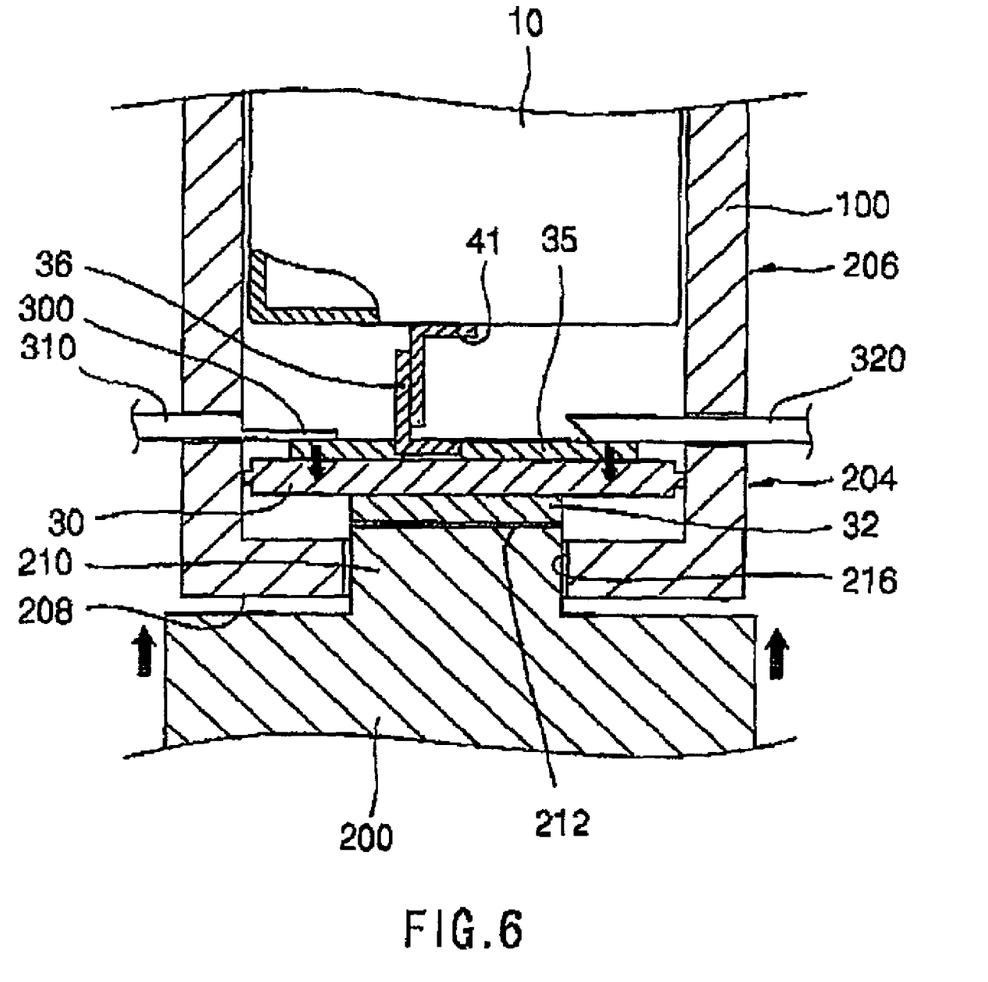
FIG. 6 is a partial sectional view showing the position of supporting pins taken through the narrowest side of the bare cell in FIG. 5.

Referring to FIGS. 5 and 6, when the upper mold portion 204 is coupled to the lower mold portion 206, the parts corresponding to external I/O terminals are removed from the front wall 208 of the upper mold portion, and thus, a hole 216 is formed. A core 210 is inserted into the hole in order to seal the hole 216 tightly to prevent an outward flow of plastic resin injected into the mold 100. The core 210 is coupled with a core main body 200 on the outside of the mold 100, and thus it moves back and forth through the hole corresponding to the movement of the core main body 200.

Once the battery is mounted in the mold 100, supporting pins 310, 320 are inserted into the mold 100 through the lateral surface of the mold parallel to the surface having the largest area of the battery. Pinholes may be previously formed at the positions into which the supporting pins 310, 320 are inserted. The pinholes may be formed in such a manner that the lateral surfaces of the supporting pins 310, 320 are in contact with the protective circuit board 30 of the battery, and more particularly, the back surface of the circuit section 35 of the protective circuit board, i.e., the surface facing the bare cell 10, when the battery is mounted in its correct position.

Once the supporting pin is fixed to the mold 100 through the pinhole and the core main body 200 is moved, the core 210 is moved into the mold 100. The front-end of the core 210 is then in close contact with the terminal surface of the external I/O terminal 32 of the protective circuit board 30. The front-end of the core 210 may form a continuous surface on the same plane as the peripheral inner surface of the mold 100. However, the front-end may slightly protrude from the peripheral surface which protects the surface of the external I/O terminal 32 from being covered with a plastic molding. As a result, the surface of the external I/O terminal 32 in the plastic-molded secondary battery has a surface level slightly receded from the peripheral surface, allowing the terminal surface to be used for set connection. If a part of the front-end of the core 210 is worn down during the process of connecting it with the terminal surface, the advancing/retraction of the core 210 may be controlled to compensate for the reduced thickness. The front-end of the core 210 may be formed to correspond to the surface of each external I/O terminal 32.

Additionally, when the core 210 is moved so that the front-end is in close contact with the surface of the external I/O terminal 32, the supporting pins 310, 320 provide resistance to the back surface of the protective circuit section 35 being pushed backwards. When at least three supporting pins are distributed around the lateral surface of the mold 100, the protective circuit board 30 is protected from forces acting on its edges. Therefore, when at least two supporting pins 310 are disposed at each longer side of the protective circuit board 30 as shown in FIG. 5 and FIG. 6, the protective circuit board 30 may be retained stably in its correct position even under pressure applied by the core 210. As a result, the protective circuit board 30 is prevented from becoming dislodged from its correct position, thereby preventing the gap between the external I/O terminal 32 and the front-end of the core 210 from becoming wider and presenting a so-called "flash" problem. Moreover, because the protective circuit board 30 may be prevented from becoming dislodged from its correct position, the procedure for moving the core 210 so that the front-end of the core is in close contact with the surface of the external I/O terminal 32 should be performed easily and freely. In this regard, in one exemplary embodiment, the supporting pin (e.g., 320) may have a tapered portion at its longitudinal end, as shown in FIG. 6.

Figure 7:
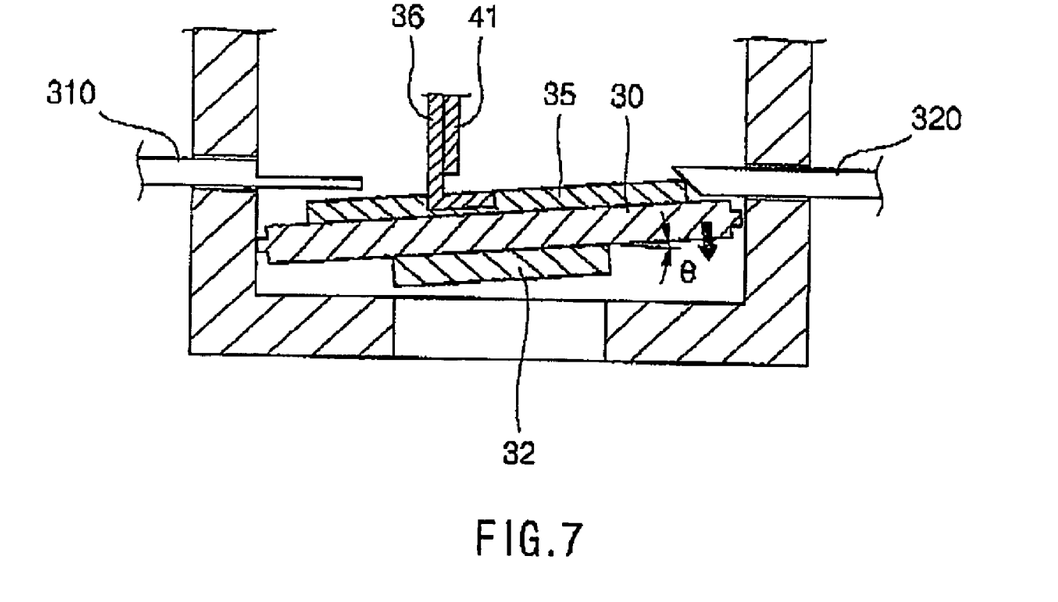
FIG. 7 is a partial sectional view showing the mechanism for guiding a protective circuit board moved away from its correct position to the correct position by a supporting pin having a tapered end, according to an embodiment of the present invention as shown in FIG. 6.

Referring now to FIG. 7, in some cases, the protective circuit board 30 mounted in the mold may become dislodged from its correct position by being pushed slightly towards the bare cell. When the tapered portion formed at the end of the supporting pin 320 is directed to the protective circuit board 30, the sharp end of the supporting pin 320 is inserted into the mold 100 first, allowing the tapered portion to contact the outer wall of the protective circuit board 30 away from its correct position by an angle θ, while the remaining part of the supporting pin 320 is inserted into the mold 100, thereby guiding and correcting the protective circuit board 30 through the angle θ to its correct position. Assuming that the integral structure of the protective circuit board 30 coupled to the bare cell is slightly inclined, in one exemplary embodiment, at least the supporting pins inserted into any one of the longer sides of the protective circuit board are formed to have a tapered portion. In this case, the resultant secondary battery may have pinholes formed at one side of the mold after the pins are removed, each pinhole having a tapered portion conformed to the shape of the end of the pin.

On the other hand, contrary to the above-described case in which the protective circuit board 30 is inclined toward the bare cell, when the protective circuit board 30 is slightly inclined toward the core of the mold, i.e., toward a hole on the front wall, away from its correct position, the core is inserted and moved before the plastic resin is injected. During this time, the core applies a pressure to the protective circuit board so that the front-end of the core is in close contact with the surface of the external I/O terminal. Therefore, the protective circuit board may be disposed in its correct position, because the protective circuit board is pushed until the back surface thereof is in contact with the supporting pin.

Further, as shown in FIG. 6, the supporting pin 310 may have a step at its end, when viewed from the longitudinal section, and thus the pin 310 may have thinner portion 300 where it contacts the back surface of the circuit section 35 than at other parts of the pin. For example, assuming that the supporting pin 310 inserted into the mold 100 extends from the exterior of the mold 100 to the interior of the mold 100, the supporting pin 310 may have a shape such that the part 300 of the supporting pin 310 inside of the mold 100 is relatively thin, while the part outside of the mold 100 is relatively thick. Such a thin supporting pin may have a reduced supporting power, but may also have improved partial elastic deformation characteristics. The number of supporting pins may be increased to compensate for the reduction of supporting power. Moreover, even if the supporting pin is contacts a part of the protective circuit board during the insertion of the supporting pin into the mold, the supporting pin may be easily inserted into the mold due to its improved elastic deformation characteristics.

Further, the section or the entrance of the pinhole has a shape corresponding to the longitudinal section of the supporting pin. For example, the pinhole may have a circular shape, a semi-circular shape or any other polygonal shapes, as necessary.

As can be seen from the foregoing, a plastic molding type secondary battery and a method of forming the same according to an embodiment of the present invention may prevent the problem of a protective circuit board being partially dislodged to generate a gap between the surface of an external I/O terminal and a mold, the surface of the external I/O terminal subsequently becoming partially covered with a plastic molding when a part of the mold corresponding to the surface of the external I/O terminal of the protective circuit board, for example, a core, is moved so as to be in contact with the surface of the external I/O terminal for the purpose of protecting the terminal surface.

Figure 9:
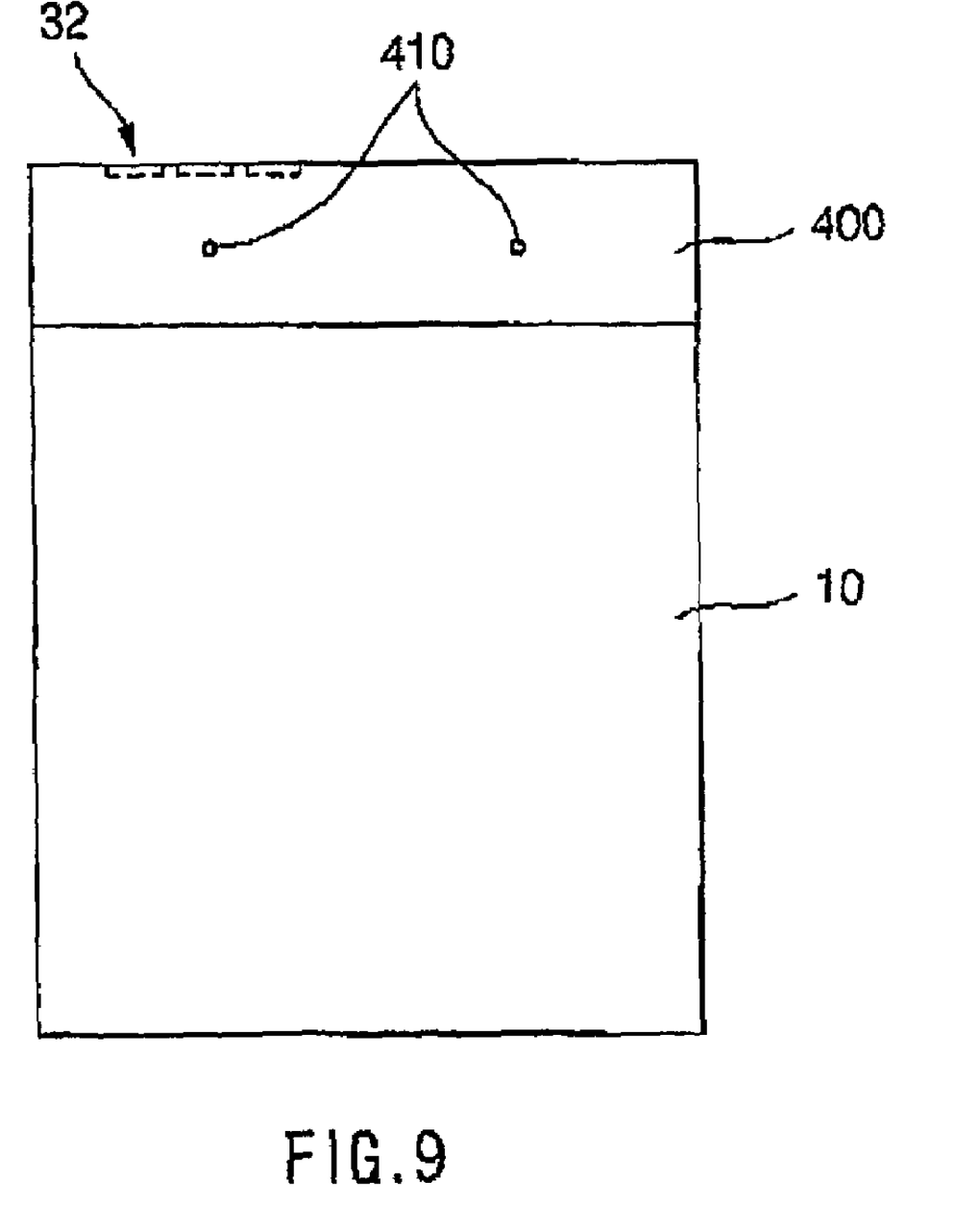
FIG. 9 is a front view of a secondary battery showing the position of supporting pins in an exemplary embodiment of the present invention
Figure 10:
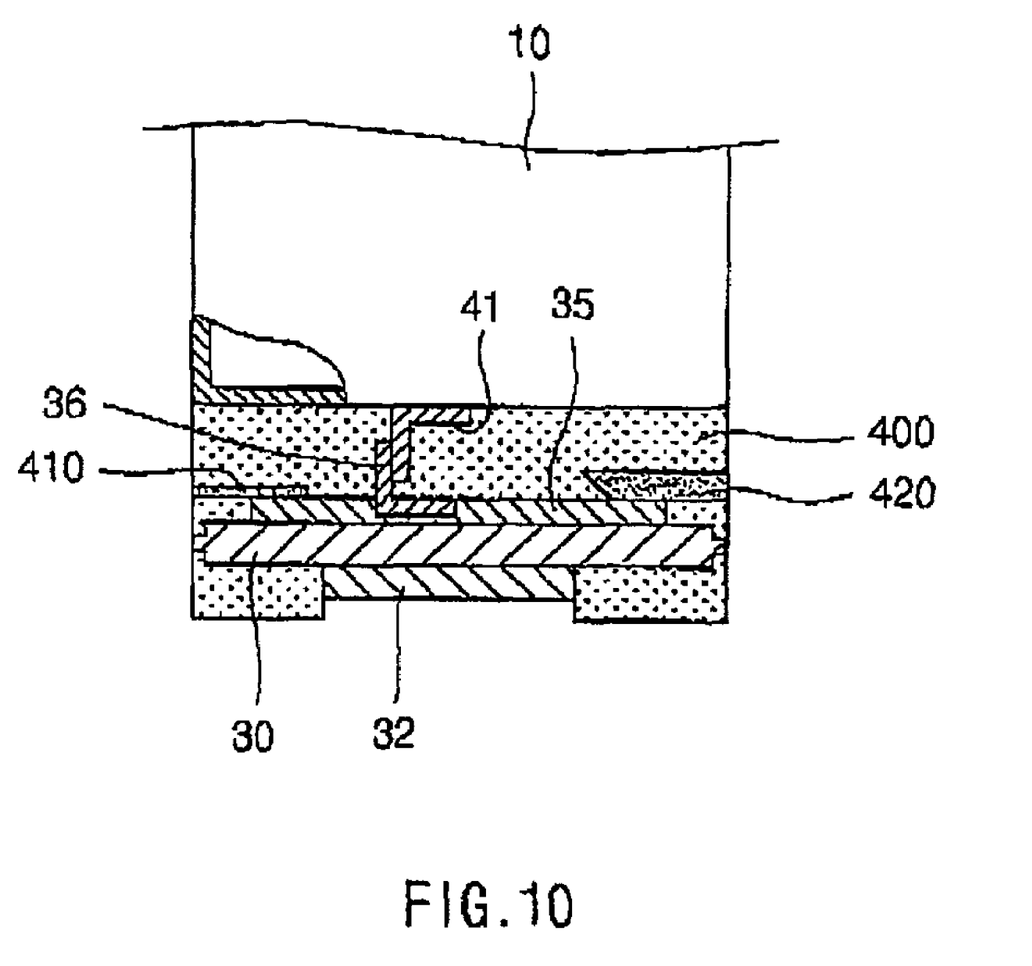
FIG. 10 is a partial sectional view showing the sectional shapes of supporting pins taken through the narrowest side of the secondary battery of FIG. 9.

In FIGS. 9 and 10, the position of the supporting pins 410, 420 in the plastic molding 400 and the section shapes of the supporting pins are shown in an exemplary embodiment of the present invention.

Further, when a protective circuit board of a battery mounted in a mold is slightly pushed toward a bare cell, the position of the protective circuit board may be corrected by using a supporting pin having a tapered portion.

Figure 8:
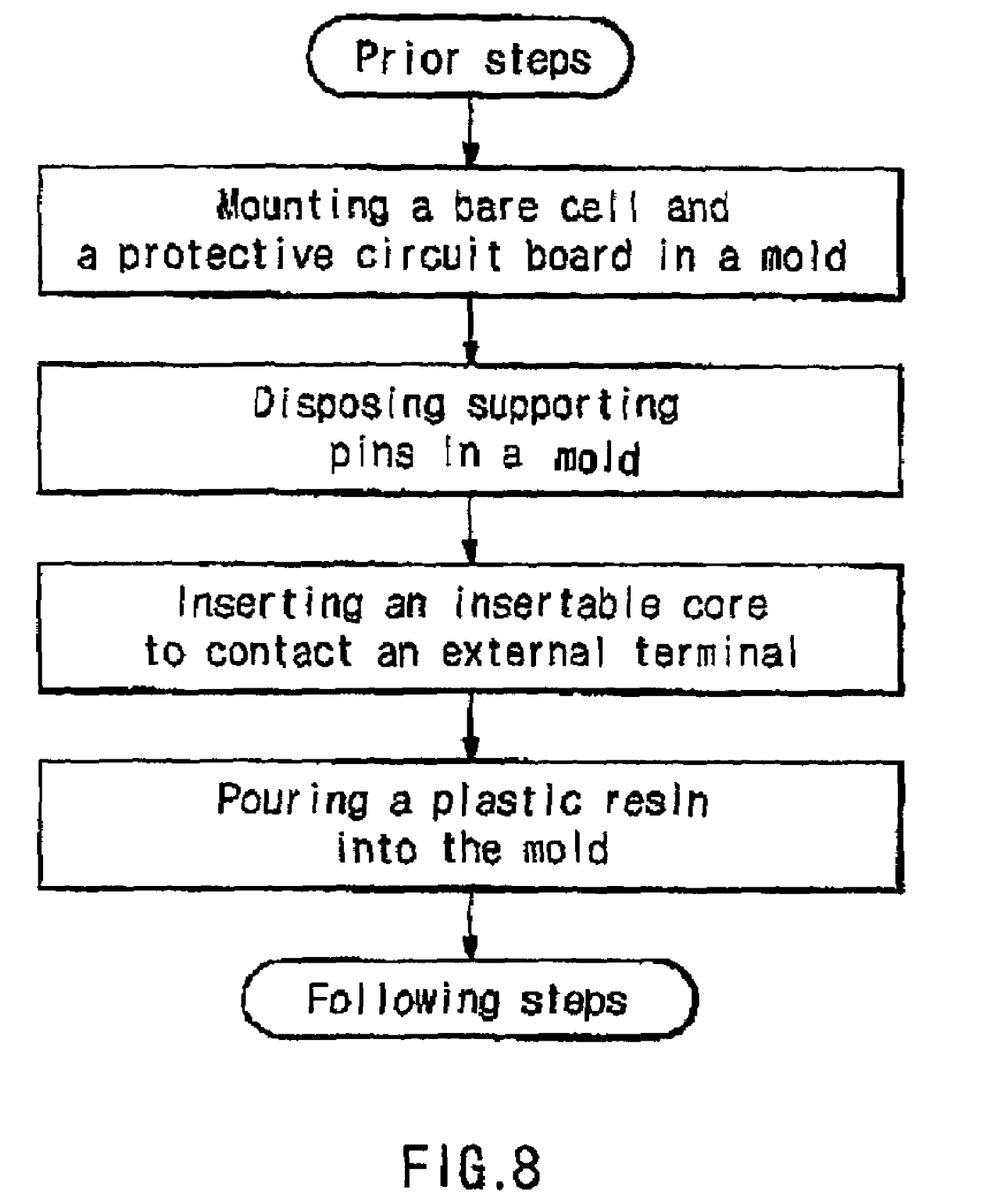
FIG. 8 is a flowchart describing the steps of a method of forming a plastic molding type secondary battery according to the present invention.

As shown in FIG. 8, the steps of an exemplary method of forming a plastic molding type secondary battery, described above and also shown in FIGS. 5-7, are summarized in a flowchart.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of forming a secondary battery comprising:
   mounting a bare cell and a protective circuit board in a mold having an axial opening;
   placing a plurality of supporting pins in the mold so that a lateral part of at least one of the plurality of supporting pins is in contact with a surface of the protective circuit board proximal to the bare cell such that the protective circuit board is in a correct position, wherein at least one of the plurality of supporting pins has a tapered insertable end inserted in the mold in a trans-axial direction toward the protective circuit board and wherein at least one of the plurality of supporting pins has a flat body portion contacting the protective circuit board proximal to the bare cell and a step configuration forming an elastically deformable insertable end thinner than a remaining portion of the pin, wherein the step configuration faces away from the protective circuit board;
   inserting an insertable core such that a front-end of the insertable core moves through the axial opening in the mold and contacts a surface of an external input/output terminal on the protective circuit board distal to the bare cell while sealing the axial opening in the mold; and
   pouring a plastic resin into the mold.

2. The method of forming a secondary battery as claimed in claim 1, wherein contacting the surface of the input/output terminal further comprises:
   inserting a post-shaped core integral with the insertable core into the axial opening in the mold at a position corresponding to the surface of the input/output terminal to form a protective part, and
   advancing the insertable core through the axial opening so that the post-shaped core protrudes into the mold.

3. The method of forming a secondary battery as claimed in claim 1, wherein disposing the plurality of supporting pins includes inserting the plurality of supporting pins from outside of the mold to inside of the mold through pinholes in the mold.

4. The method of forming a secondary battery as claimed in claim 1, wherein at least two supporting pins are formed at each longitudinal side of the protective circuit board.

5. The method of forming a secondary battery of claim 1, wherein the tapered insertable end of the at least one of the plurality of supporting pins has a different configuration from the elastically deformable insertable end of another of the at least one of the plurality of supporting pins.

* * * * *

UNITED STATES PATENT AND TRADEMARK OFFICE
CERTIFICATE OF CORRECTION

PATENT NO. : 7,659,013 B2  
APPLICATION NO. : 11/095089  
DATED : February 9, 2010  
INVENTOR(S) : Heui Sang Yoon Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1011 days.

Signed and Sealed this

Thirtieth Day of November, 2010

David J. Kappos  
*Director of the United States Patent and Trademark Office*

UNITED STATES PATENT AND TRADEMARK OFFICE
CERTIFICATE OF CORRECTION

| | | |
|---|---|---|
| PATENT NO. | : 7,659,013 B2 | Page 1 of 1 |
| APPLICATION NO. | : 11/095089 | |
| DATED | : February 9, 2010 | |
| INVENTOR(S) | : Heui Sang Yoon | |

It is certified that error appears in the above-identified patent and that said Letters Patent is hereby corrected as shown below:

On the Title Page

(57) Abstract, line 5    Delete "of" after "least"

Signed and Sealed this
Tenth Day of May, 2011

David J. Kappos
*Director of the United States Patent and Trademark Office*